(12) United States Patent
Inada et al.

(10) Patent No.: US 12,207,674 B2
(45) Date of Patent: Jan. 28, 2025

(54) ELECTRIC FIELD GENERATING DEVICE AND COLD STORAGE PROVIDED WITH SAME

(71) Applicant: DAIKIN INDUSTRIES, LTD., Osaka (JP)

(72) Inventors: Ryozo Inada, Osaka (JP); Naohiro Tanaka, Osaka (JP); Motomi Nishimoto, Osaka (JP); Hidenori Matsui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 364 days.

(21) Appl. No.: 17/562,485

(22) Filed: Dec. 27, 2021

(65) Prior Publication Data

US 2022/0117272 A1 Apr. 21, 2022

Related U.S. Application Data

(63) Continuation of application No. PCT/JP2020/025884, filed on Jul. 1, 2020.

(30) Foreign Application Priority Data

Jul. 2, 2019 (JP) .................................. 2019-124000

(51) Int. Cl.
*F25D 11/00* (2006.01)
*A23L 3/32* (2006.01)
(Continued)

(52) U.S. Cl.
CPC ...... *A23L 3/32* (2013.01); *A23L 3/36* (2013.01); *F25D 11/00* (2013.01); *F25D 23/00* (2013.01)

(58) Field of Classification Search
CPC .................................. F25D 11/00; F25D 27/00
See application file for complete search history.

(56) References Cited

U.S. PATENT DOCUMENTS

| | | | | |
|---|---|---|---|---|
| 2007/0271946 | A1* | 11/2007 | Jung ...................... | F25D 27/00 62/348 |
| 2010/0024462 | A1* | 2/2010 | Kamisako ............... | A23L 3/363 62/331 |
| 2011/0266383 | A1* | 11/2011 | Cohen ...................... | B60L 9/00 242/406 |

FOREIGN PATENT DOCUMENTS

| | | |
|---|---|---|
| CN | 108657666 A | 10/2018 |
| JP | S 53 153569 U | 12/1978 |

(Continued)

OTHER PUBLICATIONS

JP-2007192539-A Translation (Year: 2007).*

(Continued)

*Primary Examiner* — David J Teitelbaum
(74) *Attorney, Agent, or Firm* — Birch, Stewart, Kolasch & Birch, LLP (57) ABSTRACT

An electric field generating device includes an electrode and a voltage applying device that applies a voltage to the electrode. The electric field generating device is configured to generate an electric field in an indoor space of a container. The electric field generating device is provided with a supporting member that supports the electrode to be movable between a predetermined use position at which an electric field can be generated in the indoor space of the container and a predetermined housing position that differs from the use position, and a fixing member that fixes the electrode immovably at the use position.

12 Claims, 6 Drawing Sheets

(51) Int. Cl.
    *A23L 3/36*     (2006.01)
    *F25D 23/00*    (2006.01)

(56)            References Cited

FOREIGN PATENT DOCUMENTS

| | | | | |
|---|---|---|---|---|
| JP | 2007192539 A | * | 8/2007 | ............. A23B 4/015 |
| JP | 2012-207900 A | | 10/2012 | |
| JP | 2017-182885 A | | 10/2017 | |
| JP | 6366882 B1 | | 8/2018 | |
| KR | 10-1141215 B1 | | 5/2012 | |
| WO | WO-2008153285 A2 | * | 12/2008 | ............... A23L 3/32 |
| WO | WO 2009/086666 A1 | | 7/2009 | |
| WO | WO 2009/111907 A1 | | 9/2009 | |

OTHER PUBLICATIONS

WO-2008153285-A2 Translation (Year: 2008).*
English translation of the International Preliminary Report on Patentability and Written Opinion of the International Searching Authority for International Application No. PCT/JP2020/025884, dated Jan. 13, 2022.
International Search Report (PCT/ISA/210) issed in PCT/JP2020/025884, dated Sep. 24, 2020.
Extended European Search Report issued in Application No. EP 20834961.3, dated May 9, 2023.

* cited by examiner

ELECTRIC FIELD GENERATING DEVICE AND COLD STORAGE PROVIDED WITH SAME

CROSS REFERENCE TO RELATED APPLICATIONS

This application is a Continuation of PCT International Application No. PCT/JP2020/025884, filed on Jul. 1, 2020, which claims priority under 35 U.S.C § 119(a) to Japanese Patent Application No. 2019-124000, filed on Jul. 2, 2019. Each of the above applications is hereby expressly incorporated by reference, in its entirety, into the present application.

TECHNICAL FIELD

The present disclosure relates to an electric field generating device and a cold storage including the electric field generating device.

BACKGROUND ART

Generally, to keep freshness of food stored in the inside of a food storage or the like, an electric field generating device that generates an electric field in the inside of the storage is used (refer to, for example, PTL 1 presented below).

The electric field generating device disclosed in PTL 1 includes an electrode part and a voltage applying device that applies a voltage to the electrode part. In the electric field generating device, the electrode part is constituted by a sheet electrode that is stuck on a wind-up screen. The electrode part is hung down together with the screen from a ceiling at the use time and is wound up together with the screen at disuse time.

CITATION LIST

Patent Literature

PTL 1: Japanese Patent No. 6366882

SUMMARY

A first aspect of the present disclosure is an electric field generating device including an electrode (31) and a voltage applying device (32) configured to apply a voltage to the electrode (31), the electric field generating device being configured to generate an electric field in an inside of a storage (5) for food. The electric field generating device includes a supporting member (33) configured to support the electrode (31) to be movable between a predetermined use position at which an electric field can be generated in the inside of the storage (5) and a predetermined housing position that differs from the use position, and a fixing member (34) configured to fix the electrode (31) immovably at the use position.

DESCRIPTION OF EMBODIMENTS

Embodiment 1

In Embodiment 1, an example in which an electric field generating device according to the present disclosure is applied to a reefer container will be described.

A reefer container (cold storage) (1) includes a container (5) that is a mobile-type storage for housing an article, such as fresh food, a container refrigeration apparatus (10) that is a refrigerating machine for regulating the temperature of an indoor space (S) of the container (5), and an electric field generating device (30). The electric field generating device (30) is provided to generate an electric field in the indoor space (S) of the container (5) and thereby keep freshness of fresh food stored in the indoor space (S).

Container

As illustrated in FIG. 1 to FIG. 4, the container (5) is a mobile-type storage to be used for land transport, marine transport, and the like. The container (5) has a parallelepiped box shape that opens at one end portion in the longitudinal direction. The one end portion of the container (5) is closed by the container refrigeration apparatus (10). A loading-unloading opening for loading a freight that is to be stored in the indoor space (S) or unloading the freight is formed at the other end portion of the container (5). The loading-unloading opening is closed by first and second openable doors (7a, 7b). The first and second openable doors (7a, 7b) constitute a second side wall on the side of the other end portion of the container (5).

Container Refrigeration Apparatus

Figure 1:
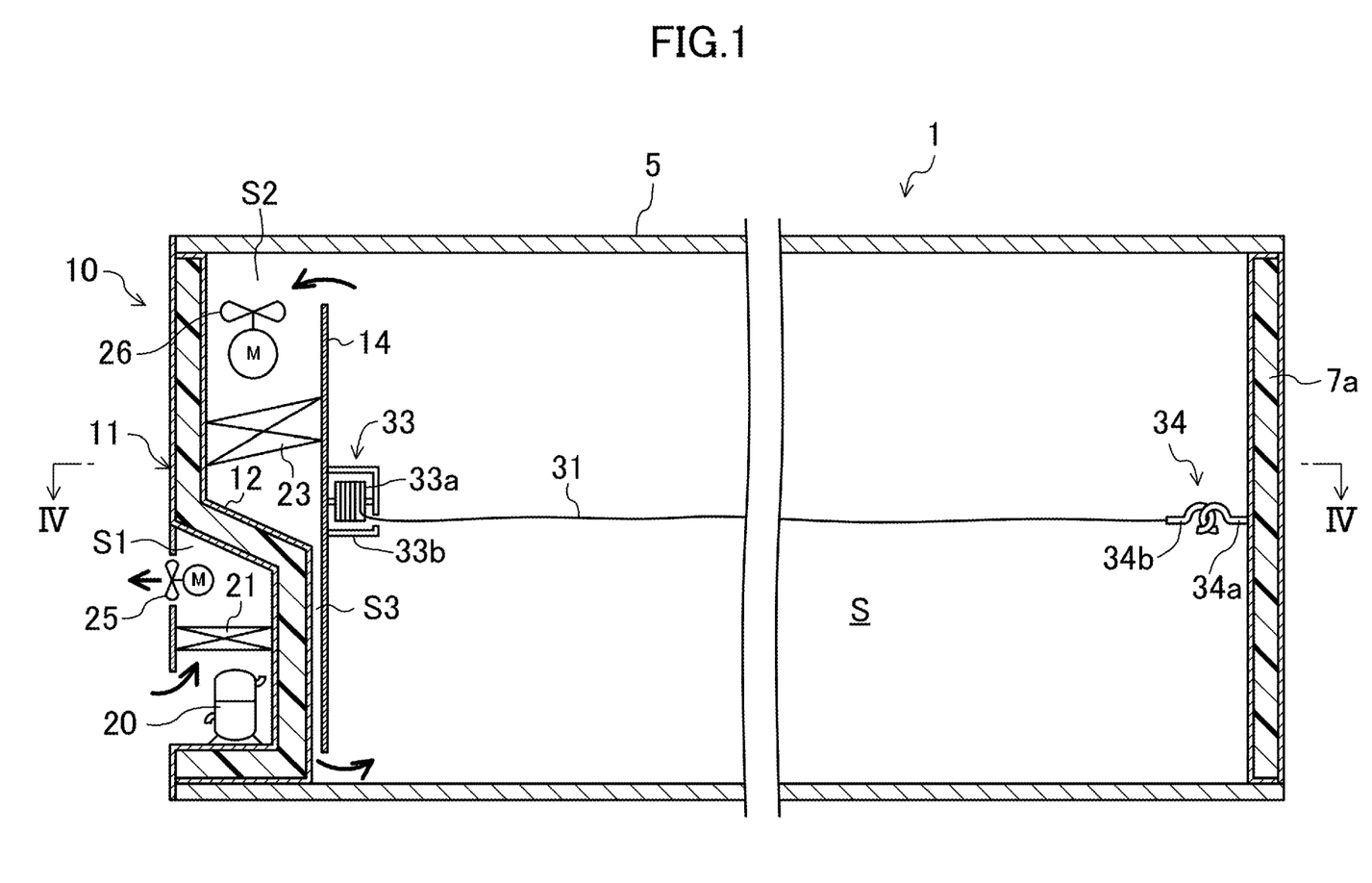
FIG. 1 is a sectional view of a reefer container according to Embodiment 1.
Figure 2:
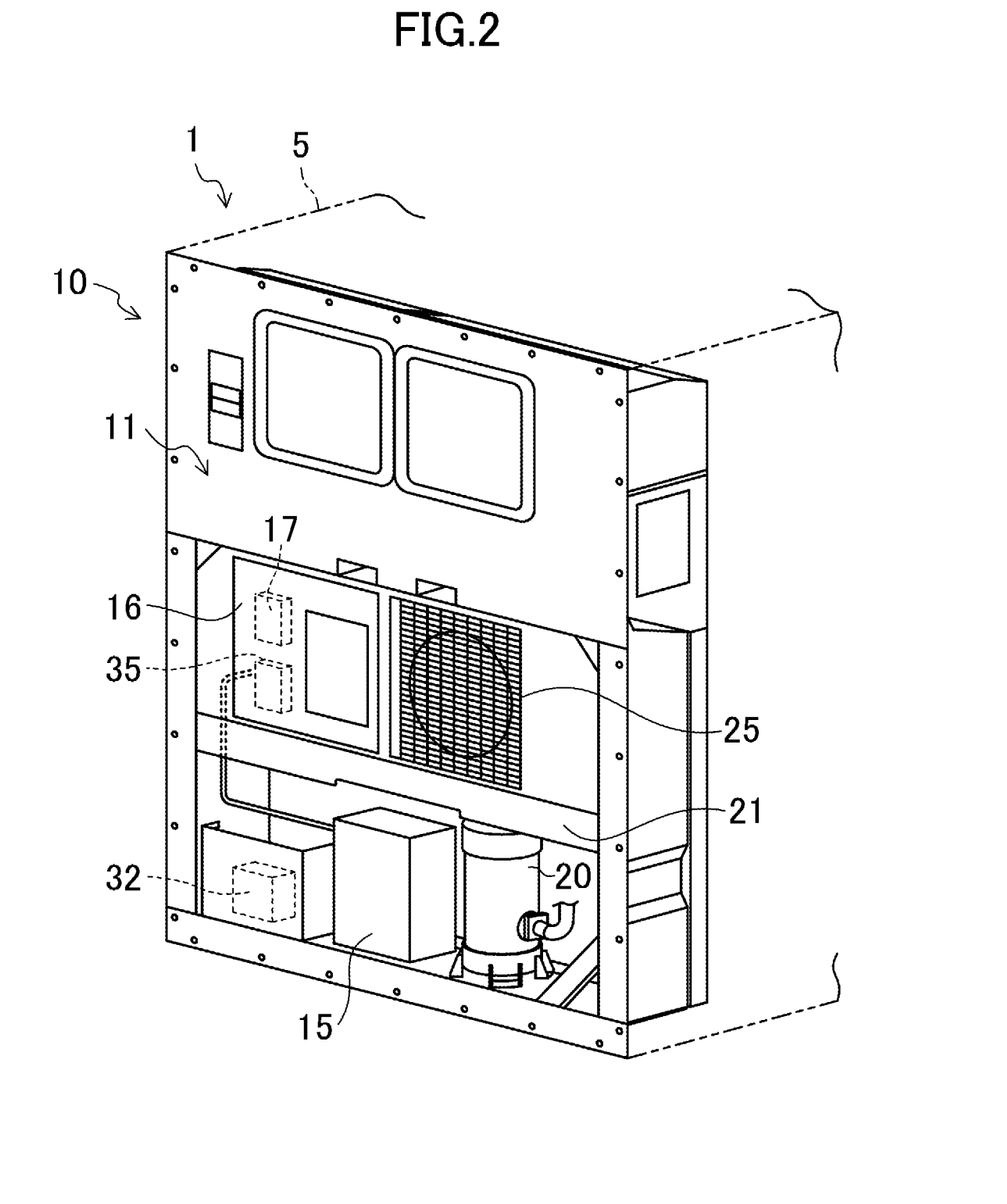
FIG. 2 is a perspective view illustrating a container refrigeration apparatus provided at a reefer container according to Embodiment 1.

As illustrated in FIG. 1 and FIG. 2, the container refrigeration apparatus (10) is configured to cool the indoor space (S) of the container (5) that is to be used for land transport, marine transport, or the like. The container refrigeration apparatus (10) includes a refrigerant circuit (not illustrated) that includes a compressor (20), a radiator (21), an expansion valve (not illustrated), and an evaporator (23) and that performs a refrigeration cycle operation. The container refrigeration apparatus (10) is mounted at one end portion of the container (5) and closes the one end portion.

The container refrigeration apparatus (10) includes a casing (11) and a partition plate (14) provided on the back side (inside) of the casing (11). A protruding portion (12) that protrudes toward the inside is formed at a lower portion of the casing (11). The internal space (outdoor space) of the protruding portion (12) constitutes an outdoor housing space (S1), and an indoor housing space (S2) positioned above the protruding portion (12) is formed in an upper portion on the back side of the casing (11). The partition plate (14) constitutes a first side wall that closes one end portion of the container (5).

The compressor (20), the radiator (21), an outdoor fan (25), an inverter box (15), and an electric-component box (16) are housed in the outdoor housing space (S1). The compressor (20) sends refrigerant to the radiator (21). The radiator (21) exchanges heat between refrigerant and outdoor air. The outdoor fan (25) is disposed above the radiator (21) and forms an airflow that passes through the radiator (21). A circuit board (not illustrated) of an inverter connected to the compressor (20) is housed in the inverter box (15). In the electric-component box (16), for example, a controller (17) that controls the operation of the container refrigeration apparatus (10) is housed. The controller (17) includes a microcomputer mounted on a control board, and a memory device (specifically, a semiconductor memory) that stores a software for operating the microcomputer. The controller (17) controls each device of the reefer container (1) on the basis of an operation instruction or a detection signal of a sensor. The aforementioned device arrangement in the outdoor housing space (S1) is one example and can be changed as necessary.

The evaporator (23) and an indoor fan (26) are mounted in the indoor housing space (S2). The indoor fan (26) supplies indoor air to the evaporator (23). In the evaporator (23), refrigerant that flows in a heat transfer tube removes heat from the indoor air and cools the indoor air. A gap between the protruding portion (12) and the partition plate (14) serves as an indoor-air flow path (S3) in which indoor air flows. The upper end of the indoor-air flow path (S3) is in communication with the indoor housing space (S2), and the lower end thereof is in communication with the indoor space (S).

Electric Field Generating Device

Figure 3:
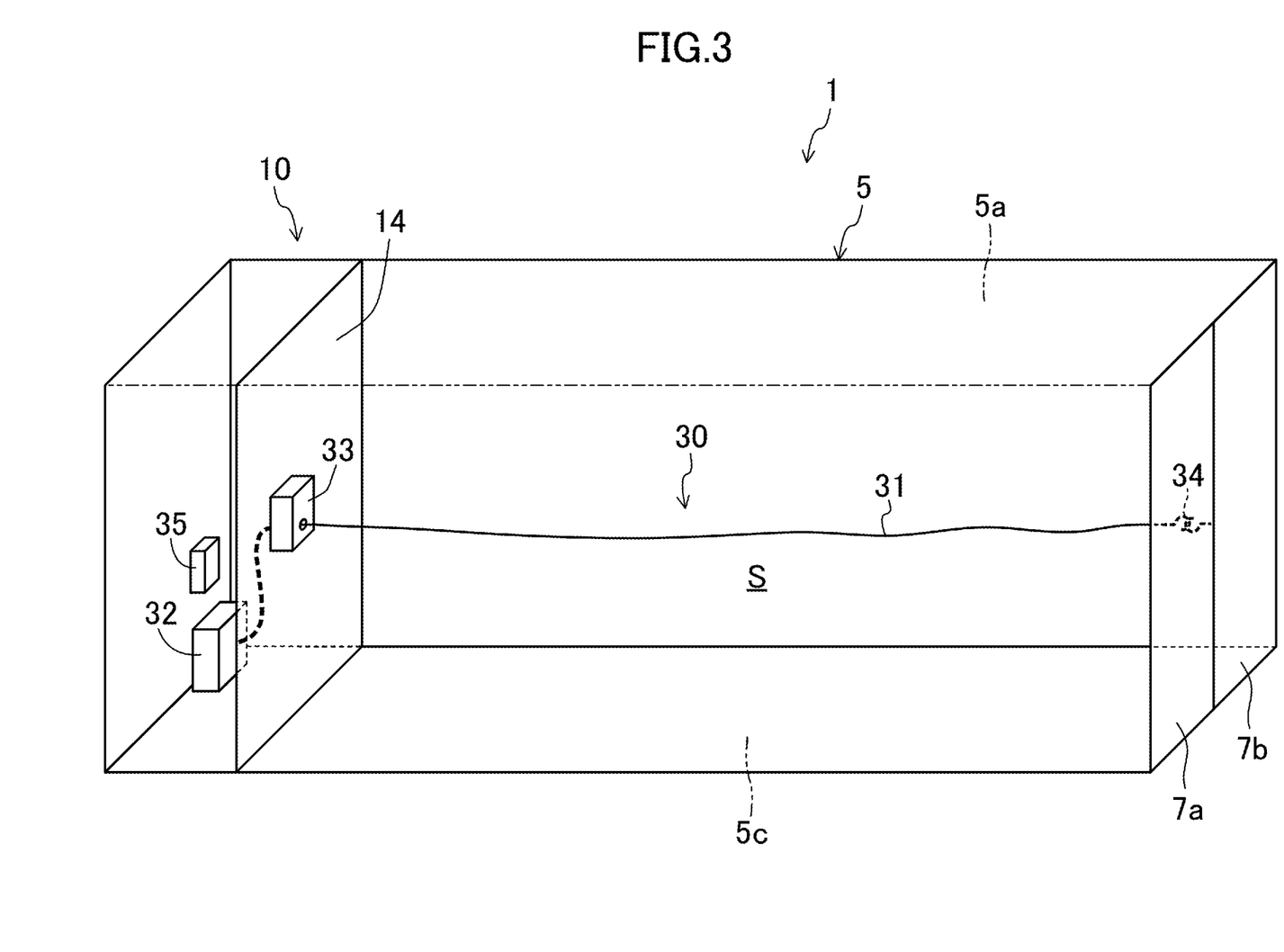
FIG. 3 is a schematic view illustrating a general configuration of an electric field generating device provided at a reefer container according to Embodiment 1.
Figure 4:
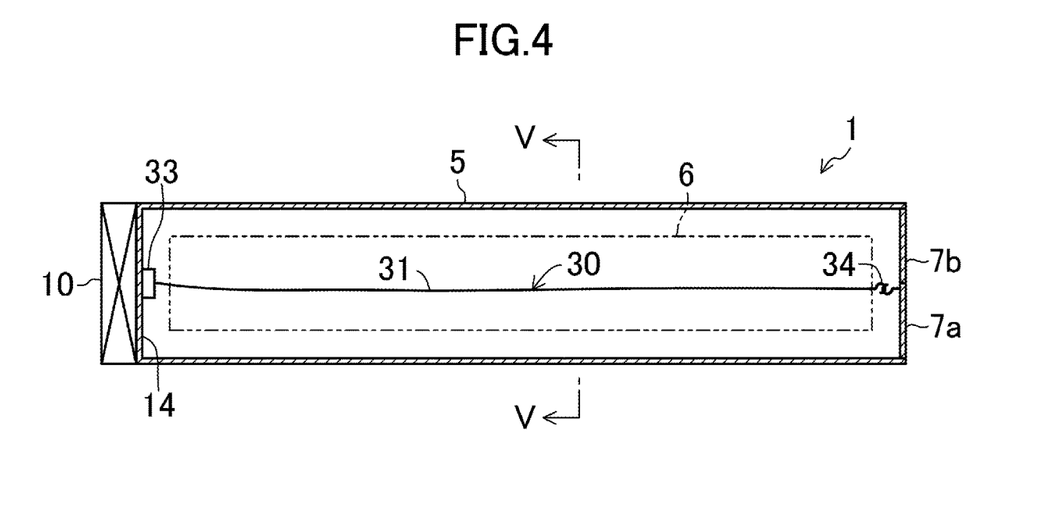
FIG. 4 is a sectional view taken along line IV-IV in FIG. 1.

As illustrated in FIG. 1, FIG. 3, and FIG. 4, the electric field generating device (30) includes an electrode (31), a voltage applying device (32), a supporting member (33), a fixing member (34), and an electric-field controller (35).

The electrode (31) is constituted by a conductive material and has an elongated shape and flexibility. The electrode (31) in the present embodiment is constituted by a metallic wire material. One end portion of the electrode (31) is fixed to the supporting member (33). The electrode (31) is supported by the supporting member (33) to be movable between a predetermined use position and a predetermined housing position. The use position and the housing position will be described later.

The voltage applying device (32) is housed in the outdoor housing space (S1). Although no illustration is provided, the voltage applying device (32) includes an AC power supply device and a booster. The voltage applying device (32) is electrically connected to the electrode (31) and applies a voltage to the electrode (31). The voltage applying device (32) boosts, for example, a voltage that is output from a three-phase 400V AC power supply device to 0.5 kV to 10 kV in the booster and applies the voltage to the electrode (31).

The supporting member (33) includes a reel drum (33a) that winds up the electrode (31), and a holder (33b) that houses the reel drum (33a). One end portion of the electrode (31) is fixed to the reel drum (33a), and the reel drum (33a) has a size with which the entirety of the long electrode (31) can be wound up. The reel drum (33a) is rotatably held by the holder (33b). The reel drum (33a) has a shaft connected to a driving device (not illustrated) and is configured to wind up the electrode (31) that is pulled out by being driven to rotate by the driving device. The reel drum (33a) is configured such that the electrode (31) can be pulled out manually. Although no illustration is provided, the holder (33b) is provided with a stopper that restricts rotation of the reel drum (33a).

With such a configuration, the supporting member (33) supports the electrode (31) to be movable between a predetermined use position and a predetermined housing position that differs from the use position.

The predetermined use position is a position of the electrode (31) at which an electric field can be generated in the indoor space (S) of the container (5) in response to a voltage applied to the electrode (31). In Embodiment 1, a position at which the electrode (31) is in a state of extending from one end side to the other end side of the container (5) through a center portion of the container (5) is the use position. More specifically, in Embodiment 1, a position at which the electrode (31) is in a state of extending in the longitudinal direction of the container (5) through a center portion of a section orthogonal to the longitudinal direction of the container (5) is the use position.

The predetermined housing position is a position in the indoor space (S) of the container (5) other than a loading space for cargos (6). In Embodiment 1, a position at which the electrode (31) is in a state of being wound up by the supporting member (33) is the housing position. In other words, the housing position in Embodiment 1 is a position at which the electrode (31) is in a state of being wound up by the reel drum (33a) in the holder (33b) of the supporting member (33).

The fixing member (34) includes first and second hooks (34a, 34b). The first hook (34a) is fixed to an inside surface of the first openable door (7a) of the two openable doors (7a, 7b) that close the loading-unloading opening of the container (5). The first openable door (7a) is a door that is closed first when the two openable doors (7a, 7b) are closed. The second hook (34b) is fixed to a tip of the electrode (31). The fixing member (34) is configured such that the second hook (34b) fixed to the tip of the electrode (31) pulled out from the housing position to the use position is hooked on the first hook (34a) fixed to the first openable door (7a) to thereby fix the electrode (31) immovably at the use position.

The electric-field controller (35) includes a microcomputer mounted on a control board, and a memory device (specifically, a semiconductor memory) that stores a software for operating the microcomputer. The electric-field controller (35) controls each device of the electric field generating device (30) on the basis of an operation instruction or a detection signal of a sensor.

Operation Action

Operation Action of Refrigeration Apparatus

The operation of the container refrigeration apparatus (10) is started by starting the compressor (20), the outdoor fan (25), and the indoor fan (26). In the refrigerant circuit of the container refrigeration apparatus (10), refrigerant discharged by the compressor (20) is sent to the radiator (21). In the radiator (21), the refrigerant that circulates therein exchanges heat with outdoor air sent by the outdoor fan (25). As a result, the refrigerant releases heat into the outdoor air and condenses.

The refrigerant that has condensed in the radiator (21) is decompressed by the expansion valve and then sent to the evaporator (23). In the evaporator (23), the refrigerant that circulates therein exchanges heat with indoor air sent by the indoor fan (26). As a result, the refrigerant absorbs heat from the indoor air and evaporates, thereby cooling the indoor air. As illustrated in FIG. 1, the indoor air flows into the indoor housing space (S2) from the upper side of the partition plate (14) and passes through the evaporator (23). After being cooled in the evaporator (23), the indoor air returns to the indoor space (S) from the lower side of the partition plate (14). The refrigerant that has evaporated in the evaporator (23) is sucked by the compressor (20) and compressed again.

Operation of Electric Field Generating Device

Moving Operation of Electrode

In the electric field generating device (30), the position of the electrode (31) is changed between a position for use time when an electric field is generated in the indoor space (S) of the container (5) and a position for disuse time when no electric field is generated in the indoor space (S) of the container (5).

Specifically, at the use time, the electrode (31) is pulled out from the housing position at which the electrode (31) is wound up by the supporting member (33) to the use position at which the electrode (31) is in a state of extending in the longitudinal direction of the container (5) through a center portion of a section orthogonal to the longitudinal direction of the container (5). Then, the second hook (34b) fixed to the tip of the electrode (31) is hooked on the first hook (34a) fixed to the first openable door (7a). As described above, the electrode (31) is fixed immovably at the use position by the fixing member (34).

At disuse time, the second hook (34b) hooked on the first hook (34a) is dismounted from the first hook (34a), and the electrode (31) is wound up by the supporting member (33) to be moved from the use position to the housing position.

In the case of Embodiment 1, when the cargos (6) to be loaded in the container (5) are not fresh food and the like and do not require generation of an electric field in the indoor space (S), the electrode (31) of the electric field generating device (30) is kept housed at the housing position. When the cargos (6) to be loaded in the container (5) are fresh food and the like and require generation of an electric field in the indoor space (S), the electrode (31) of the electric field generating device (30) is moved from the housing position to the use position.

Moving of the electrode (31) is performed, for example, when the cargos (6) are to be loaded from the far side (one end side) to the near side (the other end side) of the container (5), by gradually pulling out the electrode (31) from the supporting member (33) and inserting the electrode (31) into a gap between the cargos (6). When the cargos (6) are loaded up to the near side (the other end side) of the container (5) and when the electrode (31) is pulled out to the near side (the other end side) of the container (5), the first openable door (7a) is closed. Next, the second hook (34b) fixed to the tip of the electrode (31) pulled out to the near side (the other end side) of the container (5) is hooked on the first hook (34a) fixed to the first openable door (7a). Consequently, the electrode (31) is fixed immovably at the use position. After the electrode (31) is fixed, the second openable door (7b) is closed.

Conversely, to unload the cargos (6) from the container (5), the second openable door (7b) is first opened, and the second hook (34b) hooked on the first hook (34a) fixed to the first openable door (7a) is dismounted. Then, the first openable door (7a) is opened, and the cargos (6) are unloaded sequentially from those at the near side (the other end side) of the container (5). Next, the electrode (31) is wound up by the supporting member (33) to be returned from the use position to the housing position. The electrode (31) may be gradually wound up by the supporting member (33) along with unloading of the cargos (6) or may be wound up by the supporting member (33) after all of the cargos (6) are unloaded.

Electric Field Generating Operation of Electric Field Generating Device

In the electric field generating device (30), the electric-field controller (35) controls the operation of the voltage applying device (32), and a predetermined AC voltage is applied from the voltage applying device (32) to the electrode (31). Consequently, an electric field is formed between the electrode (31) and each inner wall surface of the grounded container (5). Due to thus formed electric field, freshness of fresh food stored in the container (5) is easily maintained.

Incidentally, in an existing electric field generating device, a plate-shaped electrode is mounted on an inner wall surface (ceiling surface, floor surface, side surface) of a storage, and an electric field is generated between the inner wall surface and an opposite surface. However, in such a configuration, an electric field is generated also between the plate-shaped electrode and inner wall surfaces adjacent to edge portions of the electrode and between the electrode and a grounded surface. It is thus not possible to generate an electric field uniformly in an indoor space. Therefore, the sizes of electric fields greatly differ depending on locations, and there is a problem that an intended effect is not exerted for maintaining freshness of fresh food.

In contrast, in Embodiment 1, the electrode (31) is fixed immovably at the use position at which the electrode (31) is in a state of extending in the longitudinal direction of the container (5) through a center portion of a section orthogonal to the longitudinal direction of the container (5), as illustrated in FIG. 3, at the use time when an electric field is generated in the indoor space (S) of the container (5). Due to the electrode (31) being fixed at such a position, differences in distances between the electrode (31) and four inner wall surfaces that surround the electrode (31) are reduced.

Figure 5:
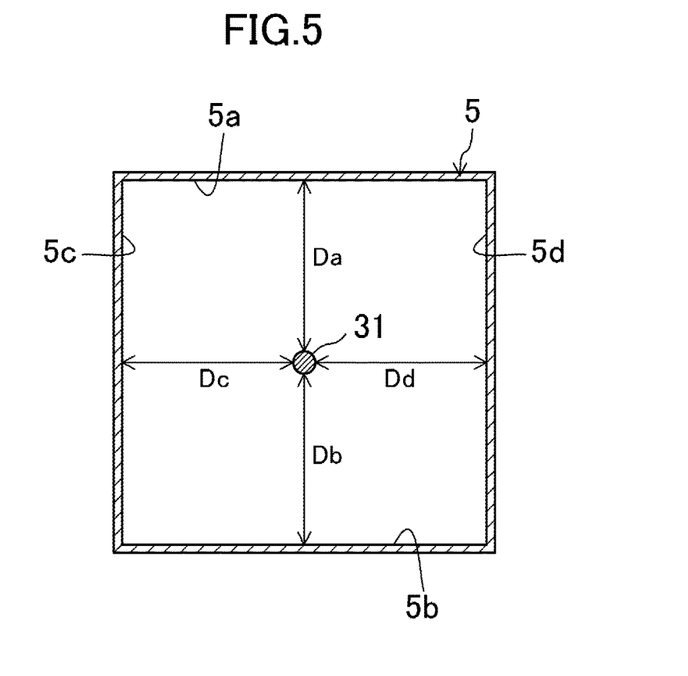
FIG. 5 is a sectional view taken along line V-V in FIG. 4.

For example, as illustrated in FIG. 5, when the section orthogonal to the longitudinal direction of the container (5) has a square shape, a distance Da between the electrode (31) and a ceiling surface (5a), a distance Db between the electrode (31) and a floor surface (5b), a distance Dc between the electrode (31) and a left side surface (5c), and a distance Dd between the electrode (31) and a right side surface (5d) are equal to each other (Da=Db=Dc=Dd). Consequently, the sizes of electric fields generated between the electrode (31) and the four inner wall surfaces (5a to 5d) are substantially equal to each other. In other words, the sizes of electric fields generated by the electric field generating device (30) do not become excessively large or excessively small at each location in the indoor space (S) of the container (5). Therefore, electric fields of uniform sizes can be generated in the entirety of the indoor space (S) of the container (5) by the electric field generating device (30). Accordingly, it is possible to reduce differences in effects of maintaining freshness depending on storage locations.

Effects of Embodiment 1

The electric field generating device (30) according to Embodiment 1 includes the electrode (31) and the voltage applying device (32) that applies a voltage to the electrode (31) and generates an electric field in the indoor space (S) of the container (5). The electric field generating device (30) also includes the supporting member (33) that supports the electrode (31) to be movable between a predetermined use position at which an electric field can be generated in the indoor space (S) of the container (5) and a predetermined housing position that differs from the use position, and the fixing member (34) that fixes the electrode (31) immovably at the use position.

In the electric field generating device (30) according to Embodiment 1, the electrode (31) is supported by the supporting member (33) to be movable between the use position and the housing position. In other words, in the electric field generating device (30) according to Embodiment 1, the electrode (31) is configured to be movable. Therefore, at disuse time when no electric field is generated in the indoor space (S) of the container (5), the electrode (31) is housed at a predetermined housing position to be disposed not to obstruct loading and unloading of cargos.

In addition, due to including the fixing member (34), the electric field generating device (30) according to Embodiment 1 is capable of immovably fixing the movable electrode (31) at the use position. Therefore, even when the electric field generating device (30) is used in the container (5) for transport, the position of the electrode (31) is not changed at the use time, and it is possible to stably generate an electric field in the indoor space (S) of the container (5).

In the electric field generating device (30) according to Embodiment 1, the electrode (31) has an elongated shape, and a position at which the electrode (31) is in a state of extending from one end side to the other end side of the container (5) through a center portion of the container (5) is the use position.

In the electric field generating device (30) according to Embodiment 1, the electrode (31) having an elongated shape is disposed to extend through a center portion of the container (5) at the use time of the electric field generating device (30) to thereby reduce differences in distances between the electrode (31) and the inner wall surfaces (ceiling surface (5a), floor surface (5b), side surfaces (5c, 5d)) of the container (5) around the electrode (31). Therefore, the electric field generating device (30) according to Embodiment 1 is capable of generating electric fields having similar sizes between the electrode (31) and the inner wall surfaces (ceiling surface (5a), floor surface (5b), side surfaces (5c, 5d)) of the container (5). In other words, electric fields of uniform sizes can be generated in the entirety of the indoor space (S) of the container (5) by the electric field generating device (30). Accordingly, it is possible to reduce differences in effects of maintaining freshness depending on storage locations.

In the electric field generating device (30) according to Embodiment 1, the electrode (31) has flexibility, and the supporting member (33) is configured to be able to wind up the electrode (31). A position at which the electrode (31) is in a state of being wound up by the supporting member (33) is the housing position.

In the electric field generating device (30) according to Embodiment 1, the electrode (31) can be wound up by the supporting member (33) to be housed at the disuse time when no electric field is generated in the indoor space (S) of the container (5). It is thus possible to house the electrode (31) at a location where the electrode (31) is not obstructive, without dismounting the electrode (31), when cargos other than fresh food are to be stored. In addition, the electrode (31) is easily movable between the use position and the housing position by the winding-up structure.

Moreover, in the electric field generating device (30) according to Embodiment 1, one end portion of the electrode (31) is fixed to the supporting member (33), and the supporting member (33) is provided at the partition plate (14) on one end side of the container (5). Furthermore, in the electric field generating device (30) according to Embodiment 1, the fixing member (34) fixes the other end portion of the electrode (31) to the first openable door (7a) on the other end side of the container (5) to thereby fix the electrode (31) immovably at the use position.

As described above, in the electric field generating device (30) according to Embodiment 1, it is possible to easily move the electrode (31) from the housing position to the use position by pulling out the electrode (31) that is wound up by the supporting member (33) provided at the partition plate (14) on one end side of the container (5) and firing the electrode (31) to the first openable door (7a) on the other end side of the container (5). Conversely, it is possible to easily move the electrode (31) from the use position to the housing position by releasing the fixation by the fixing member (34) and winding up the electrode (31).

The reefer container (1) according to Embodiment 1 is a cold storage including the container (5) and the container refrigeration apparatus (10) that cools the inside of the container (5), the cold storage being provided with the electric field generating device (30).

Due to including the electric field generating device (30), the reefer container (1) according to Embodiment 1 can stably generate an electric field in the indoor space (S) of the container (5) of the reefer container (1).

Modification of Embodiment 1

In a modification of Embodiment 1, configurations of the electrode (31) and the supporting member (33) of the electric field generating device (30) in Embodiment 1 are changed.

In a modification of Embodiment 1, the electrode (31) is constituted by an elastic conductive material and has an elongated shape and elasticity. The supporting member (33) does not include the reel drum (33a) and includes only the holder (33b). One end portion of the electrode (31) is fixed to as inner wall surface of the holder (33b).

With such a configuration, the electrode (31) is expanded or contracted to be moved to the use position or the housing position in a modification of Embodiment 1.

Specifically, at the use time of the electric field generating device (30) for generating as electric field in the indoor space (S) of the container (5), the second hook (34b) fixed to the tip of the electrode (31) is pulled to expand the electrode (31) and move the electrode (31) from the housing position at which the electrode (31) is housed in the holder (33b) of the supporting member (33) to the use position at which the electrode (31) is in a state of extending in the longitudinal direction of the container (5) through a center portion of a section orthogonal to the longitudinal direction of the container (5). Then, the second hook (34b) fixed to the tip of the electrode (31) is hooked on the first hook (34a) fixed to the first openable door (7a). As described above, the electrode (31) is fixed immovably at the use position by the fixing member (34).

At the disuse time of the electric field generating device (30) for generating no electric field in the indoor space (S) of the container (5), the second hook (34b) hooked on the first hook (34a) is dismounted from the first hook (34a), and the electrode (31) is contracted to be moved from the use position to the housing position.

As described above, in the electric field generating device (30) according to a modification of Embodiment 1, the electrode (31) has elasticity, the supporting member (33) is configured to be able to house the electrode (31), and a position at which the electrode (31) is in a state of being contracted and housed in the supporting member (33) is the housing position.

In the electric field generating device (30) according to a modification of Embodiment 1, the electrode (31) can be contracted and housed in the supporting member (33) at the disuse time when no electric field is generated in the inside of the container (5). It is thus possible to house the electrode (31) at a location where the electrode (31) is not obstructive, without dismounting the electrode (31), when cargos other than fresh food are to be stored. In addition, the electrode (31) is easily movable between the use position and the housing position by only being expanded or contracted.

In the electric field generating device (30) according to a modification of Embodiment 1, one end portion of the electrode (31) is fixed to the supporting member (33), and the supporting member (33) is provided at the partition plate (14) on one end side of the container (5). In the electric field generating device (30) according to a modification of Embodiment 1, the fixing member (34) fixes the electrode (31) at the use position immovably by fixing the other end portion of the electrode (31) to the first openable door (7a) on the other end side of the container (5).

As described above, in the electric field generating device (30) according to a modification of Embodiment 1, it is possible to easily move the electrode (31) from the housing position to the use position by pulling out the electrode (31) housed is the supporting member (33) that is provided at the partition plate (14) on one end side of the container (5) and fixing the electrode (31) to the first openable door (7a) on the other end side of the container (5). Conversely, it is possible to move the electrode (31) easily from the use position to the housing position by releasing the fixation by the fixing member (34) and contracting the electrode (31).

Embodiment 2

In Embodiment 2, configurations of the electrode (31), the supporting member (33), and the fixing member (34) of the electric field generating device (30) in Embodiment 1 are changed.

Figure 6:
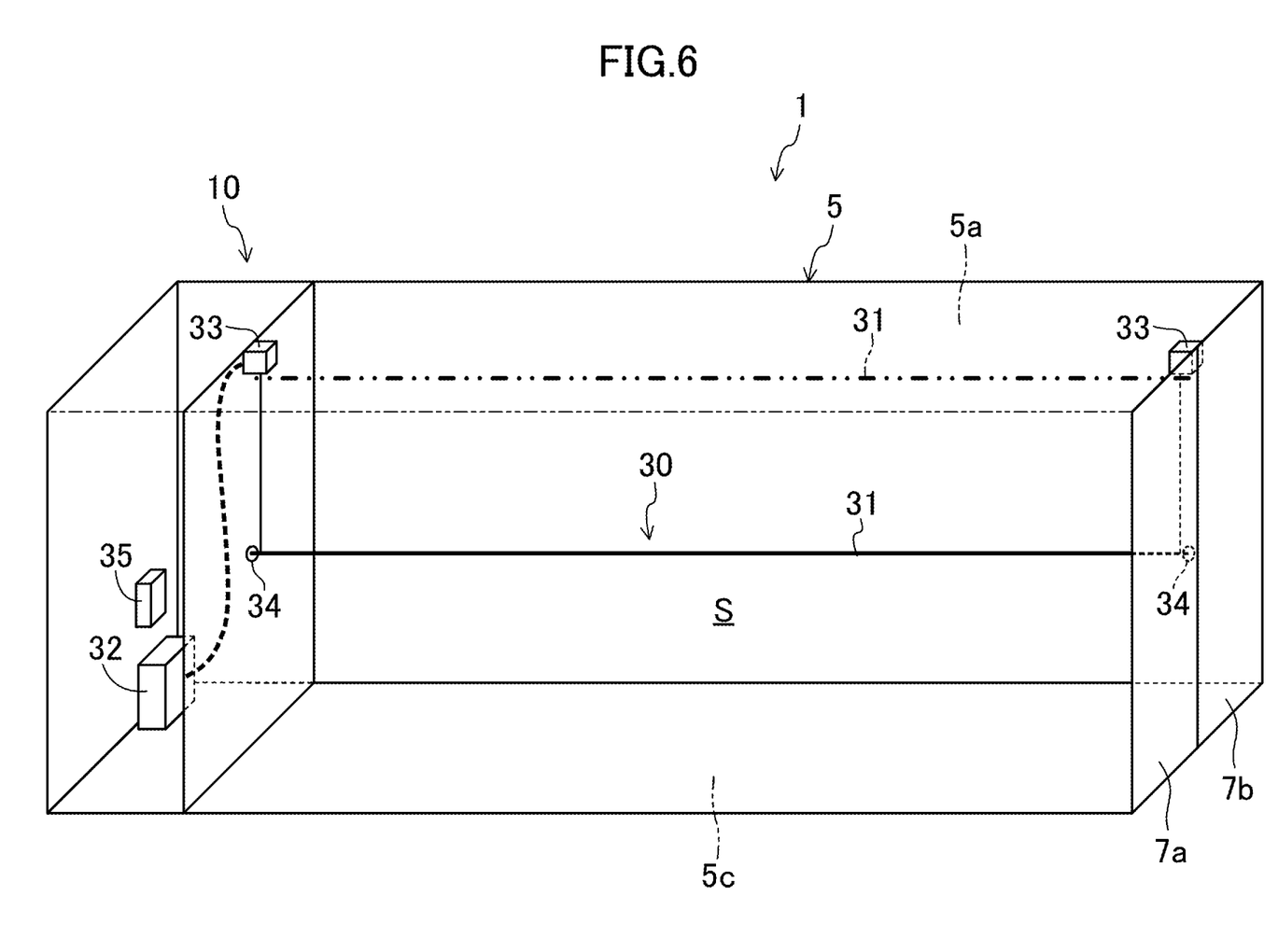
FIG. 6 is a schematic view illustrating a general configuration of an electric field generating device provided at a reefer container according to Embodiment 2.

As illustrated in FIG. 6, the electrode (31) in Embodiment 2 is constituted by a rod-shaped member formed of a conductive member that does not have flexibility and elasticity.

The supporting member (33) is constituted by a lifting mechanism that lifts and lowers the rod-shaped electrode (31) between a housing position near the ceiling surface (5a) and a use position below the housing position and at which the rod-shaped electrode (31) is in a state of extending in the longitudinal direction of the container (5) through a center portion of a section orthogonal to the longitudinal direction of the container (5).

The fixing member (34) is constituted by holding members that are fixed to the partition plate (14) and the first openable door (7a) and that hold one end portion and the other end portion of the electrode (31) at the use position, respectively. The holding members may be any members that are configured not to be disposed at a moving path during moving of the electrode (31) and configured to be able to hold one end portion and the other end portion of the electrode (31) after the electrode (31) reaches the use position.

With such a configuration, the electrode (31) is movable between the use position and the housing position by the supporting member (33) lifting and lowering the electrode (31) in Embodiment 2.

Specifically, at the use time of the electric field generating device (30) for generating an electric field in the indoor space (S) of the container (5), the electrode (31) is lowered by the supporting member (33) to move the electrode (31) from the housing position near the ceiling surface (5a) to the use position at which the electrode (31) is in a state of extending in the longitudinal direction of the container (5) through a center portion of a section orthogonal to the longitudinal direction of the container (5). Then, the two fixing members (34) hold one end portion and the other portion of the electrode (31), thereby causing the electrode (31) to be immovable at the use position.

Meanwhile, at the disuse time of the electric field generating device (30) for generating no electric field in the indoor space (S) of the container (5), the two fixing members (34) are dismounted from the electrode (31), and the electrode (31) is lifted by the supporting member (33) to be moved from the use position to the housing position.

Effects of Embodiment 2

Also in the electric field generating device (30) according to Embodiment 2, the electrode (31) is supported by the supporting member (33) to be movable between the use position and the housing position. In other words, also in the electric field generating device (30) according to Embodiment 2, the electrode (31) is configured to be movable. Therefore, at disuse time when no electric field is generated in the indoor space (S) of the container (5), the electrode (31) is housed at a predetermined housing position to be disposed not to obstruct loading and unloading of cargos.

In addition, due to including the fixing member (34), the electric field generating device (30) according to Embodiment 2 is also capable of immovably fixing the movable electrode (31) at the use position. Therefore, even when the electric field generating device (30) is used in the container (5) for transport, the position of the electrode (31) is not changed at the use time, and it is possible to stably generate an electric field in the indoor space (S) of the container (5).

In addition, also in the electric field generating device (30) according to Embodiment 2, the electrode (31) having an elongated shape is disposed to extend through a center portion or the container (5) at the use time of the electric field generating device (30) to thereby reduce differences in distances between the electrode (31) and the inner wall surfaces (ceiling surface (5a), floor surface (5b), side surfaces (5c, 5d)) of the container (5) around the electrode (31). Therefore, the electric field generating device (30) according to Embodiment 2 is also capable of generating electric fields having similar sizes between the electrode (31) and the inner wall surfaces (ceiling surface (5a), floor surface (5b), side surfaces (5c, 5d)) of the container (5). In other words, electric fields of uniform sizes can be generated in the entirety of the indoor space (S) of the container (5) by the electric field generating device (30). Accordingly, it is possible to reduce differences in effects of maintaining freshness depending on storage locations.

Other Embodiments

In the aforementioned embodiments and modification of the electric field generating device (30), the electrode (31)

has a linear or rod-like elongated shape. The shape of the electrode (31) is, however, not limited to an elongated shape. The electrode (31) may have an undeformable plate shape or may have a sheet shape.

In the electric field generating device (30) according to the aforementioned embodiments and modification, the supporting member (33) supports the electrode (31) to be movable between the use position and the housing position by supporting the electrode (31) to be able to be pulled out and wound up, supporting the electrode (31) to be able to be expanded and contracted, or supporting the electrode (31) to be able to be lifted and lowered. The supporting member (33) is, however, not limited to those described above. The supporting member (33) may be any member that is capable of supporting, in accordance with the shape of the electrode (31), the electrode (31) to be movable between a predetermined use position for generating an electric field in the indoor space (S) and a predetermined housing position at which the electrode (31) does not obstruct loading and unloading of the cargos (6).

In the electric field generating device (30) according to the aforementioned embodiments and modification, the fixing member (34) is constituted by the hooks (34a, 34b) or the holding members. The fixing member (34) is, however, not limited thereto and may be any member that is capable of fixing the electrode (31) immovably at a predetermined use position in accordance with the shape of the electrode (31).

In the electric field generating device (30) according to the aforementioned embodiments and modification, an electric field is generated in the indoor space (S) by only the one electrode (31) having an elongated shape. The number of the electrodes (31) is, however, not limited to one and may be two or more. For example, the rod-shaped electrode (31) illustrated in FIG. 6 may be constituted by a plurality of electrodes (31), and each electrode (31) may be provided with the supporting member (33) constituted by a lifting mechanism, and the fixing member (34).

Figure 7:
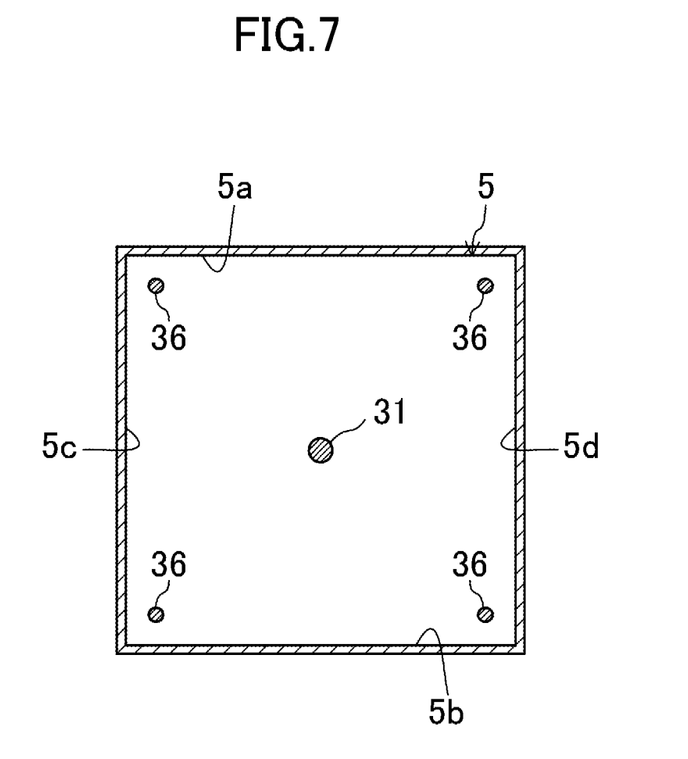
FIG. 7 is a sectional view of a reefer container according to a different embodiment, the view corresponding to FIG. 5.

In addition, as illustrated in FIG. 7, four auxiliary electrodes (36) each configured similarly to the electrode (31) having an elongated shape may be provided such that the state of extending in the longitudinal direction of the container (5) through four corner portions of a section orthogonal to the longitudinal direction of the container (5) is the use position, and the supporting members (33) and the fixing members (34) for supporting and fixing, respectively, the four auxiliary electrodes (36) may be provided. Due to the auxiliary electrodes (36) provided at the corner portions, at each of which a distance from the electrode (31) is large and the strength of the electric field is weak, in the indoor space (S) of the container (5), nonuniformity of the electric fields generated in the indoor space (S) is further suppressed.

The configuration of the container refrigeration apparatus (10) in the aforementioned embodiments and modification is not limited to those described above and may be changed to other configurations.

Although embodiments and modifications have been described above, it should be understood that various changes in the forms and the details are possible without departing from the gist and the scope of the claims. The above embodiments and modifications may be combined and replaced, as appropriate, as long as the directed functions of the present disclosure are not lost.

INDUSTRIAL APPLICABILITY

As described above, the present disclosure is useful for an electric field generating device and a cold storage including the electric field generating device.

EXPLANATION OF REFERENCES 1 reefer container (cold storage)
5 container (storage)
7a first openable door (second side wall)
10 container refrigeration apparatus (refrigeration apparatus)
14 partition plate (first side wall)
30 electric field generating device
31 electrode
32 voltage applying device
33 supporting member
34 fixing member
S indoor space

The invention claimed is:

1. An electric field generating device comprising an electrode and a voltage applying device configured to apply a voltage to the electrode, the electric field generating device being configured to generate an electric field in an inside of a storage for food,
wherein the electric field generating device comprises:
a supporting member configured to support the electrode to be movable between a predetermined use position at which an electric field can be generated in the inside of the storage and a predetermined housing position that differs from the predetermined use position; and
a fixing member configured to fix the electrode immovably at the predetermined use position;
the predetermined use position and the predetermined housing position are inside the storage, and
the fixing member is configured to fix the electrode immovably to the storage at the predetermined use position.

2. The electric field generating device according to claim 1,
wherein the electrode has an elongated shape, and
the predetermined use position is a position at which the electrode is in a state of extending from one end side to another end side of the storage through a center portion of the storage.

3. The electric field generating device according to claim 2,
wherein the electrode has flexibility,
the supporting member is configured to be able to wind up the electrode, and
the predetermined housing position is a position at which the electrode is in a state of being wound up by the supporting member.

4. The electric field generating device according to claim 2,
wherein the electrode has elasticity,
the supporting member is configured to be able to house the electrode, and
the predetermined housing position is a position at which the electrode is in a state of being contracted and housed in the supporting member.

5. The electric field generating device according to claim 3,
wherein one end portion of the electrode is fixed to the supporting member, the supporting member is provided near a first side wall on the one end side of the storage, and the fixing member is configured to fix the electrode immovably at the predetermined use position by fixing another end portion of the electrode to a second side wall on the other end side of the storage.

6. The electric field generating device according to claim 4, wherein one end portion of the electrode is fixed to the supporting member, the supporting member is provided near a first side wall on the one end side of the storage, and the fixing member is configured to fix the electrode immovably at the predetermined use position by fixing another end portion of the electrode to a second side wall on the other end side of the storage.

7. A cold storage comprising a storage for food and a refrigeration apparatus configured to cool an inside of the storage, wherein the cold storage comprises the electric field generating device according to claim 1.

8. A cold storage comprising a storage for food and a refrigeration apparatus configured to cool an inside of the storage, wherein the cold storage comprises the electric field generating device according to claim 2.

9. A cold storage comprising a storage for food and a refrigeration apparatus configured to cool an inside of the storage, wherein the cold storage comprises the electric field generating device according to claim 3.

10. A cold storage comprising a storage for food and a refrigeration apparatus configured to cool an inside of the storage, wherein the cold storage comprises the electric field generating device according to claim 4.

11. A cold storage comprising a storage for food and a refrigeration apparatus configured to cool an inside of the storage, wherein the cold storage comprises the electric field generating device (30) according to claim 5.

12. A cold storage comprising a storage for food and a refrigeration apparatus configured to cool an inside of the storage, wherein the cold storage comprises the electric field generating device according to claim 6.

* * * * *